(12) United States Patent
Aoki et al.

(10) Patent No.: US 11,685,260 B2
(45) Date of Patent: Jun. 27, 2023

(54) CONTROL DEVICE

(71) Applicant: TOYOTA JIDOSHA KABUSHIKI KAISHA, Toyota (JP)

(72) Inventors: Kazuma Aoki, Toyota (JP); Koji Hokoi, Toyota (JP); Yusuke Furuhashi, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 235 days.

(21) Appl. No.: 17/083,828

(22) Filed: Oct. 29, 2020

(65) Prior Publication Data

US 2021/0221226 A1 Jul. 22, 2021

(30) Foreign Application Priority Data

Jan. 20, 2020 (JP) .................... 2020-006513

(51) Int. Cl.
*B60K 35/00* (2006.01)
*B60K 6/24* (2007.10)
(Continued)

(52) U.S. Cl.
CPC ............... *B60K 35/00* (2013.01); *B60K 6/24* (2013.01); *B60K 6/26* (2013.01); *F02D 41/062* (2013.01);
(Continued)

(58) Field of Classification Search
CPC . B60K 35/00; B60K 6/24; B60K 6/26; B60K 41/062; B60K 41/068;
(Continued)

(56) References Cited

U.S. PATENT DOCUMENTS

| 2002/0005178 A1 | 1/2002 | Iwatani et al. | |
| 2010/0063662 A1* | 3/2010 | Harada | B60K 6/445 180/65.21 |

(Continued)

FOREIGN PATENT DOCUMENTS

| CN | 204851452 U | 12/2015 |
| CN | 107399328 A | 11/2017 |

(Continued)

*Primary Examiner* — Mahmoud Gimie
(74) *Attorney, Agent, or Firm* — Finnegan, Henderson, Farabow, Garrett & Dunner, LLP

(57) ABSTRACT

A vehicle includes a display device that displays information indicating an operation state of an internal combustion engine. A display control device which is a control device that controls the display device includes an acquisition unit configured to acquire the operation state of the internal combustion engine. The display control device includes a display control unit that switches information which is displayed on the display device between a warm-up indicator for notifying that warm-up of the internal combustion engine is being performed and a warm-up completion indicator for notifying that warm-up of the internal combustion engine has been completed. The display control unit is configured to prohibit switching from the warm-up completion indicator to the warm-up indicator when the warm-up completion indicator is being displayed on the display device while the internal combustion engine is operating.

2 Claims, 2 Drawing Sheets

(51) Int. Cl.
*B60K 6/26* (2007.10)
*F02D 41/06* (2006.01)
(52) U.S. Cl.
CPC ...... *F02D 41/068* (2013.01); *B60K 2370/152* (2019.05); *B60K 2370/167* (2019.05); *B60K 2370/168* (2019.05)
(58) Field of Classification Search
CPC ........ B60K 2370/167; B60K 2370/152; B60K 2370/168
USPC .......................................................... 701/22
See application file for complete search history.

(56) References Cited

U.S. PATENT DOCUMENTS

| | | | |
|---|---|---|---|
| 2011/0202210 A1* | 8/2011 | Goda | B60L 50/16 903/930 |
| 2014/0138172 A1* | 5/2014 | Suzuki | B60K 6/442 903/903 |
| 2017/0027491 A1 | 9/2017 | Ishibashi et al. | |

FOREIGN PATENT DOCUMENTS

| | | |
|---|---|---|
| JP | 2002-089424 A | 3/2002 |
| JP | 2003-217630 A | 7/2003 |
| JP | 2015-010478 A | 1/2015 |
| JP | 2017-171031 A | 9/2017 |

\* cited by examiner

CONTROL DEVICE

CROSS-REFERENCE TO RELATED APPLICATION

This application claims priority to Japanese Patent Application No. 2020-006513 filed on Jan. 20, 2020, incorporated herein by reference in its entirety.

BACKGROUND

1. Technical Field

The present disclosure relates to a control device that controls a display device which is provided in a hybrid vehicle.

2. Description of Related Art

Japanese Unexamined Patent Application Publication No. 2002-89424 (JP 2002-89424 A) discloses a control device for a vehicle that turns on a lamp which notifies a driver of the vehicle that an internal combustion engine is warming up.

SUMMARY

A hybrid vehicle including a motor generator in addition to an internal combustion engine may travel in a state in which combustion in the internal combustion engine is temporarily stopped. Accordingly, after warm-up has been completed, the temperature of a coolant or the temperature of a catalyst in the internal combustion engine may decrease and warm-up may be performed again while the hybrid vehicle is traveling. When a driver is notified of warm-up that is re-performed as disclosed in JP 2002-89424 A and a driver recognizes that the internal combustion engine continues to operate, there is concern of the driver feeling that the warm-up is being re-performed even though warm-up was already completed. That is, a difference between a state which is recognized by a driver and information of which the driver is notified may cause the driver to feel discomfort.

A control device according to an aspect of the present disclosure is a control device that is applied to a vehicle including an internal combustion engine and a motor generator that are power sources and a display device that displays information indicating an operation state of the internal combustion engine and being able to travel with power of the motor generator in a state in which supply of fuel to the internal combustion engine is stopped and that controls the display device. The control device includes an acquisition unit configured to acquire the operation state of the internal combustion engine and a display control unit that switches information which is displayed on the display device between a warm-up indicator for notifying that warm-up of the internal combustion engine is being performed while the internal combustion engine is operating and a warm-up completion indicator for notifying that warm-up of the internal combustion engine has been completed while the internal combustion engine is operating. The display control unit is configured to prohibit switching from the warm-up completion indicator to the warm-up indicator when the warm-up completion indicator is being displayed on the display device.

With this configuration, display of the display device is not switched from the warm-up completion indicator to the warm-up indicator. Accordingly, even when warm-up is requested again while the internal combustion engine is operating after warm-up has been completed, the display device continues to display the warm-up completion indicator. Accordingly, it is possible to prevent a driver from feeling discomfort due to recognizing that warm-up is performed again after warm-up has been completed while the internal combustion engine continues to operate.

In an example of the control device, the display control unit may be configured to switch display of the display device to a stop indicator for notifying that the operation of the internal combustion engine is stopped in addition to the warm-up indicator and the warm-up completion indicator, to display the stop indicator on the display device when the operation of the internal combustion engine is stopped, to display the warm-up indicator on the display device when the internal combustion engine is operating and a warm-up request which is a request for warming up the internal combustion engine is issued, to display the warm-up completion indicator on the display device when the internal combustion engine is operating and the warm-up request is not issued, and to display the stop indicator on the display device when the internal combustion engine is operating, the warm-up request is not issued, and a starting operation of the internal combustion engine is being performed.

When display of the display device is switched between the warm-up indicator and the warm-up completion indicator based on only whether the warm-up request to the internal combustion engine is issued, there is a problem in that the warm-up completion indicator may be displayed even when the starting operation of the internal combustion engine is being performed, it is not determined whether warm-up is necessary, and the warm-up request is not issued yet.

In this regard, according to the above-mentioned configuration, the stop indicator can be displayed while the starting operation of the internal combustion engine is being performed. Accordingly, it is possible to curb display of the warm-up completion indicator while the starting operation of the internal combustion engine is being performed. Since the warm-up completion indicator is not displayed but the stop indicator is displayed while the starting operation is being performed, switching to the warm-up indicator is not prohibited when the warm-up request is issued. That is, when warm-up is requested after the starting operation of the internal combustion engine has been completed, it is possible to switch display of the display device to the warm-up indicator. Accordingly, it is possible to prevent a driver from feeling discomfort due to a difference between a state which is recognized by the driver and information of which the driver is notified.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
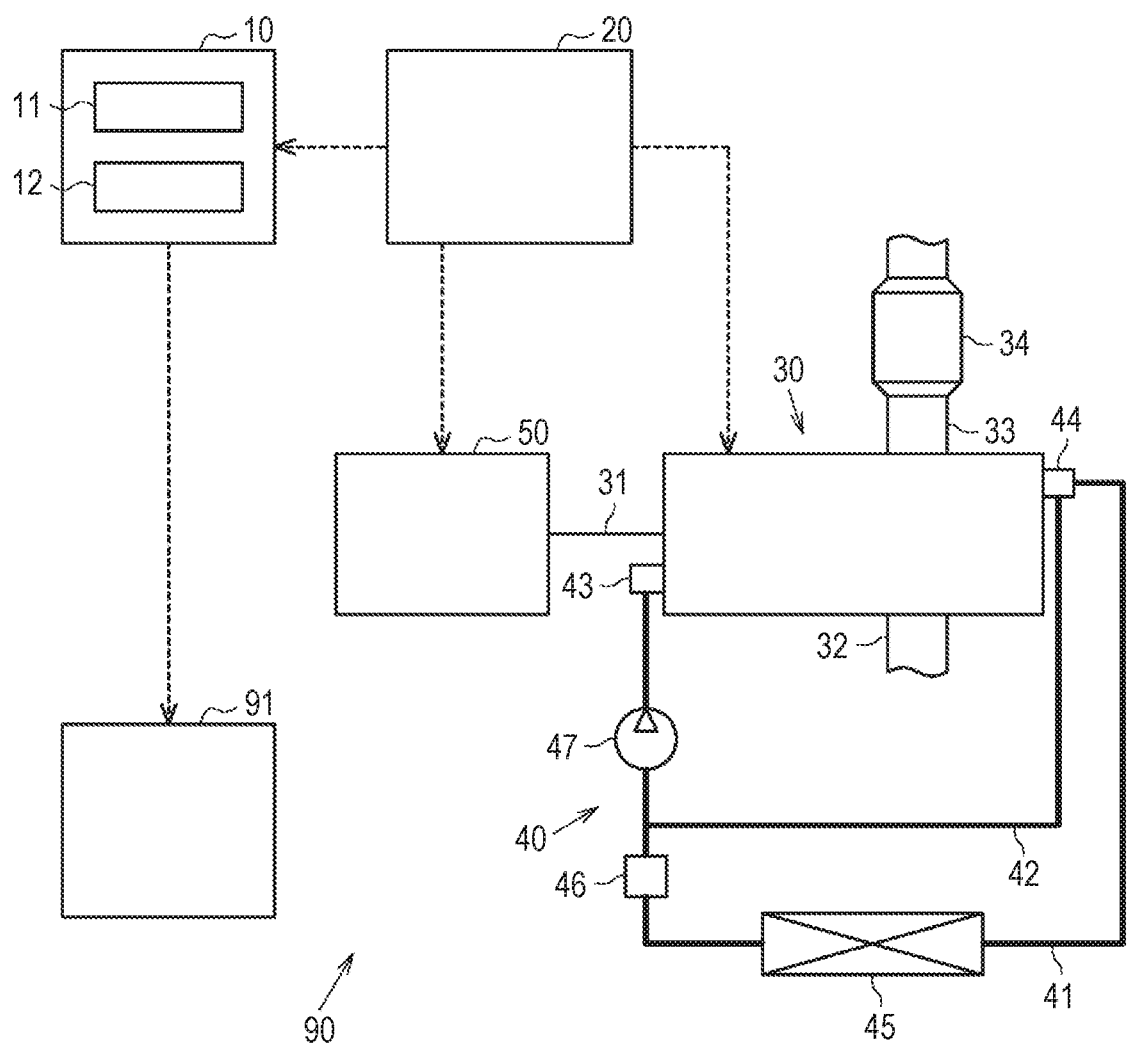
FIG. 1 is a diagram schematically illustrating a control device according to an embodiment of the present disclosure and a vehicle having the control device mounted therein.

Hereinafter, a control device according to an embodiment of the present disclosure will be described with reference to FIGS. 1 and 2. FIG. 1 illustrates a vehicle 90, a display device 91 that is provided in the vehicle 90, and a display control device 10 that is a control device for the display device 91.

The vehicle 90 is a so-called hybrid vehicle in which an internal combustion engine and a motor generator are mounted as power sources for traveling. The vehicle 90 includes an internal combustion engine 30 and a motor generator 50 that is connected to a crankshaft 31 of the internal combustion engine 30. The motor generator 50 is connected to the crankshaft 31 via a power splitting/integrating mechanism which is constituted by a planetary gear mechanism.

The motor generator 50 can function as a power generator. In the vehicle 90, when an output of the internal combustion engine 30 is input to the motor generator 50 via the crankshaft 31, electric power can be generated by the motor generator 50.

The motor generator 50 can function as an electric motor. When the motor generator 50 functions as an electric motor, the crankshaft 31 can be rotated by inputting an output of the motor generator 50 to the crankshaft 31.

The vehicle 90 includes a battery. When the motor generator 50 functions as a power generator, the battery is charged with electric power which is supplied from the motor generator 50. When the motor generator 50 functions as an electric motor, the battery supplies electric power to the motor generator 50.

The internal combustion engine 30 includes an intake passage 32 for introducing intake air into a combustion chamber. The internal combustion engine 30 includes a fuel injection valve that injects fuel. The internal combustion engine 30 causes an air-fuel mixture of fuel and intake air introduced into the combustion chamber to combust and includes an exhaust passage 33 that discharges the air-fuel mixture having combusted in the combustion chamber as exhaust gas. A catalyst device 34 that purifies exhaust gas flowing in the exhaust passage 33 is provided in the exhaust passage 33.

In the internal combustion engine 30, a coolant circulates to a water jacket which is formed around the combustion chamber. The internal combustion engine 30 includes a cooling device 40 that cools the coolant by heat exchange. A coolant inlet 43 that allows a coolant to flow into the water jacket and a coolant outlet 44 that allows a coolant to flow out of the water jacket are provided in the internal combustion engine 30. The internal combustion engine 30 includes a first coolant passage 41 that connects the coolant inlet 43 and the coolant outlet 44. A radiator 45 that is mounted in the vehicle 90 is provided in the first coolant passage 41. An electronic thermostat 46 and an electric water pump 47 are sequentially arranged on a side closer to the coolant inlet 43 than the radiator 45 in the first coolant passage 41.

When the water pump 47 is activated in a state in which the thermostat 46 is opened, a flow for causing a coolant to flow from the water jacket to the first coolant passage 41 via the coolant outlet 44 and causing a coolant to flow from the first coolant passage 41 to the water jacket via the coolant inlet 43 is formed. When a coolant flowing in the first coolant passage 41 passes through the radiator 45, heat is exchanged between outside air and the coolant and the coolant is cooled. On the other hand, when the thermostat 46 is closed, a coolant is not introduced into the radiator 45.

In the cooling device 40, one end of a second coolant passage 42 is connected to the coolant outlet 44. The other end of the second coolant passage 42 is connected to a portion between the thermostat 46 and the water pump 47 in the first coolant passage 41. When the water pump 47 is activated, a flow for causing a coolant to flow from the water jacket to the second coolant passage 42 via the coolant outlet 44 and causing a coolant to flow into the water jacket via the coolant inlet 43 is formed regardless of open and closed states of the thermostat 46.

A vehicle control device 20 is an electronic control unit that controls the vehicle 90. Detection signals from various sensors which are provided in the vehicle 90 are input to the vehicle control device 20. For example, the vehicle control device 20 calculates a temperature of a coolant circulating in the water jacket based on the detection signal from a coolant temperature sensor. For example, the vehicle control device 20 calculates a temperature of exhaust gas which is discharged to the exhaust passage 33 based on the detection signal from an exhaust gas temperature sensor. The vehicle control device 20 calculates a temperature of the catalyst device 34 based on the temperature of the exhaust gas. The vehicle control device 20 calculates an amount of intake air into the combustion engine based on the detection signal from an air flowmeter. The vehicle control device 20 estimates an engine temperature of the internal combustion engine 30 based on an integrated value of an amount of intake air into the combustion chamber. The engine temperature of the internal combustion engine 30 can be estimated to become higher as the integrated value of the amount of intake air becomes greater.

The vehicle control device 20 has a function of controlling the internal combustion engine 30 and a function of controlling the motor generator 50. The vehicle control device 20 performs a starting operation when the internal combustion engine 30 is started in a state in which the operation of the internal combustion engine 30 is stopped. The vehicle control device 20 ends the starting operation when the internal combustion engine 30 starts its autonomous operation.

The vehicle control device 20 performs a warm-up process of the internal combustion engine 30. The warm-up process is, for example, a process of increasing an amount of heat with combustion of an air-fuel mixture by delaying an ignition time. The vehicle control device 20 performs a warm-up process when a warm-up request is issued and continues to perform the warm-up process until issuance of the warm-up request stops. The warm-up request is issued when the temperature of the coolant is low, when the temperature of the catalyst is low, or when the engine temperature is low. For example, the vehicle control device 20 issues the warm-up request when the temperature of the coolant is lower than a prescribed determination coolant temperature. The vehicle control device 20 also issues the warm-up request when the temperature of the catalyst is lower than a prescribed determination temperature. Alternatively, the vehicle control device 20 also issues the warm-up request when the engine temperature of the internal combustion engine 30 is lower than a prescribed determination engine temperature.

The vehicle control device 20 can switch a power source of the vehicle 90 according to a travel mode in which the vehicle 90 travels. For example, when the travel mode is an EV mode, the vehicle control device 20 stops the operation of the internal combustion engine 30 and sets the motor generator 50 as the power source of the vehicle 90. In the EV mode, the operation of the internal combustion engine 30 is stopped. When the travel mode is an HV mode, the vehicle control device 20 sets the internal combustion engine 30 and the motor generator 50 as power sources of the vehicle 90. In the HV mode, the vehicle control device 20 can temporarily stop injection of fuel to stop the operation of the internal combustion engine 30. The vehicle control device 20 can perform motoring of rotating the crankshaft 31 of the internal combustion engine 30 with the output of the motor generator 50 in the state in which injection of fuel is temporarily stopped. When motoring is being performed, the internal combustion engine 30 is operating because combustion of an air-fuel mixture is stopped but the crankshaft 31 is rotating.

When the operation of the internal combustion engine 30 is stopped, the vehicle control device 20 stops activation of the water pump 47 to stop circulation of a coolant. The vehicle 90 includes a display device 91 that displays information indicating the operation state of the internal combustion engine 30. The display device 91 is an image display device that can display a character string and an image. The display device 91 is disposed in a passenger compartment of the vehicle 90. Screen display of the display device 91 is controlled by the display control device 10.

The display device 91 can display a character string "warming up" as an example of a warm-up indicator for notifying that warm-up of the internal combustion engine 30 is being performed. The display device 91 can display a character string "warm-up complete" as an example of a warm-up completion indicator for indicating that warm-up of the internal combustion engine 30 has been completed. The display device 91 can display a character string "stopped" as an example of a stop indicator for notifying that the operation of the internal combustion engine 30 is stopped. The display device 91 has only to display a schematic diagram of the internal combustion engine 30 in colors corresponding to respective information such that a driver of the vehicle 90 can understand which of the warm-up indicator, the warm-up completion indicator, and the stop indicator is indicated by information displayed on the display device 91. The operation state of the internal combustion engine 30 is not limited to the schematic diagram but may include display of an abstract figure or sign or the like.

The display device 91 may display other information in addition to the information indicating the operation state of the internal combustion engine 30. For example, the display device 91 may display information indicating the operation state of the motor generator 50. The display device 91 may display a selected travel mode.

The vehicle 90 includes the display control device 10 which is a control device that controls the display device 91. The display control device 10 includes an acquisition unit 11 and a display control unit 12 as functional units. The acquisition unit 11 acquires the operation state of the internal combustion engine 30 from the vehicle control device 20. For example, the acquisition unit 11 acquires information indicating whether the operation of the internal combustion engine 30 is stopped, whether the starting operation of the internal combustion engine 30 is being performed, and whether a warm-up request is issued, as the operation state of the internal combustion engine 30.

The display control unit 12 has a function of switching information which is displayed on the display device 91. By performing the process routine illustrated in FIG. 2 which will be described later, the display control unit 12 displays one of the warm-up indicator, the warm-up completion indicator, and the stop indicator on the display device 91 based on the operation state of the internal combustion engine 30 acquired by the acquisition unit 11.

The vehicle control device 20 and the display control device 10 have only to have one of the following configurations (a) to (c). (a) This configuration includes one or more processors that perform various processes according to a computer program. Each processor includes a CPU and a memory such as a RAM and a ROM. The memory stores program codes or commands which are configured to cause the CPU to perform processes. The memory, that is, a computer-readable medium, includes all available mediums that can be accessed by a general-purpose computer or a dedicated computer. (b) This configuration includes one or more dedicated hardware circuits that perform various processes. Examples of each dedicated hardware circuit include an application specific integrated circuit (ASIC) and a field-programmable gate array (FPGA). (c) This configuration includes a processor that performs some of various processes according to a computer program and a dedicated hardware circuit that performs the other processes of the various processes.

Figure 2:
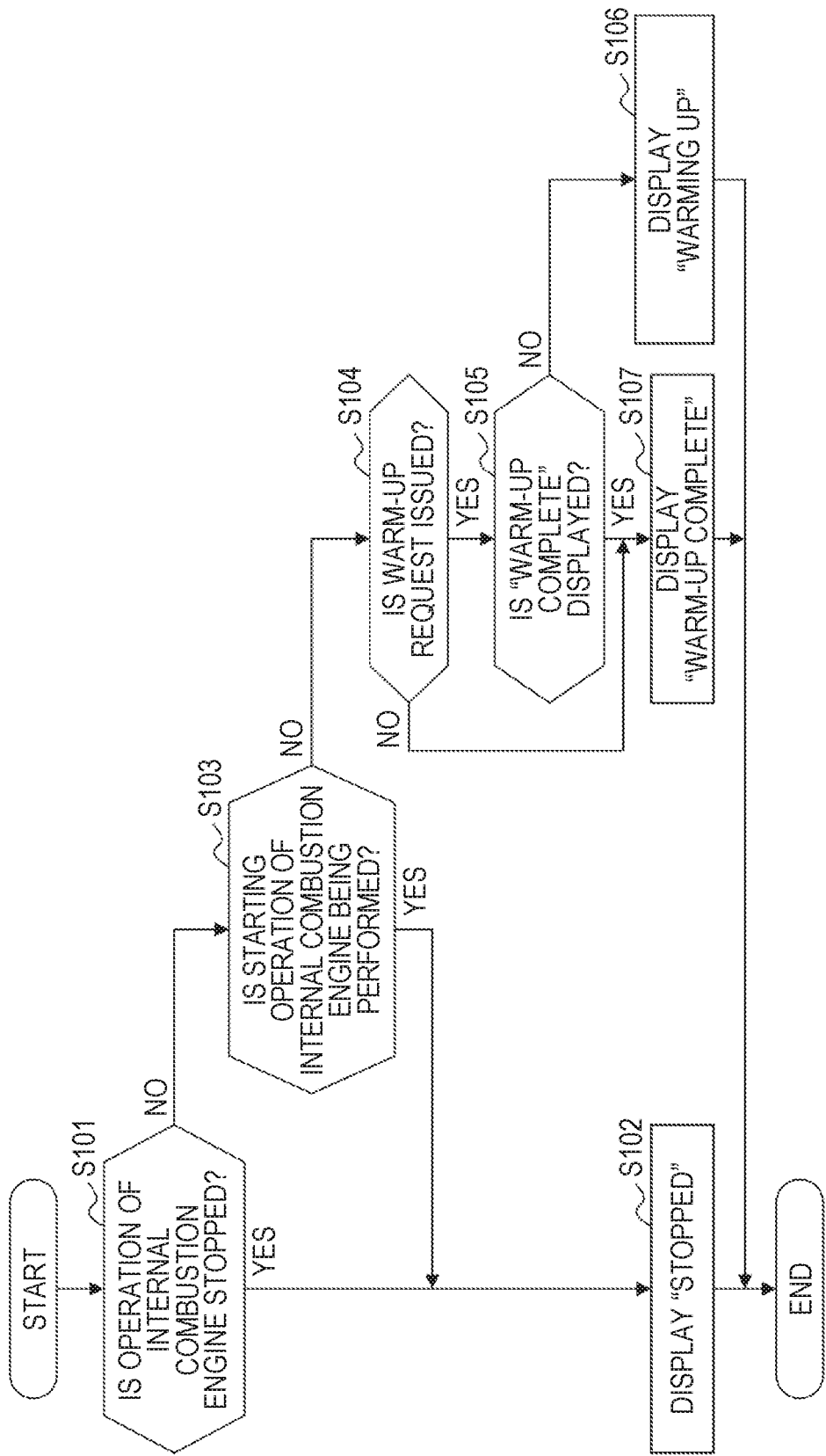
FIG. 2 is a flowchart illustrating a process flow which is performed by the control device to control a display device.

FIG. 2 illustrates a process routine which is performed by the display control unit 12. The display control device 10 repeatedly performs this process routine every predetermined cycle. When this process routine is started, the display control unit 12 first determines whether the operation of the internal combustion engine 30 is stopped in Step S101. When the operation of the internal combustion engine 30 is stopped (S101: YES), the display control unit 12 causes the process routine to proceed to Step S102. In Step S102, the display control unit 12 displays "stopped" on the display device 91. Thereafter, the display control unit 12 ends this process routine.

On the other hand, when it is determined in Step S101 that the operation of the internal combustion engine 30 is not stopped (S101: NO), that is, when the crankshaft 31 of the internal combustion engine 30 is rotating, the display control unit 12 causes the process routine to proceed to Step S103.

In Step S103, the display control unit 12 determines whether the starting operation of the internal combustion engine 30 is being performed. When the starting operation of the internal combustion engine 30 is being performed (S103: YES), the display control unit 12 causes the process routine to proceed to Step S102. The display control unit 12 displays "stopped" on the display device 91 in Step S102 and ends this process routine.

On the other hand, when it is determined in Step S103 that the starting operation of the internal combustion engine 30 is not being performed (S103: NO), that is, when the starting operation of the internal combustion engine 30 has ended, the display control unit 12 causes the process routine to proceed to Step S104.

In Step S104, the display control unit 12 determines whether a warm-up request is issued. When a warm-up request is not issued (S104: NO), the display control unit 12 causes the process routine to proceed to Step S107. In Step S107, the display control unit 12 displays "warm-up complete" on the display device 91. Thereafter, the display control unit 12 ends this process routine.

On the other hand, when it is determined in Step S104 that a warm-up request is issued (S104: YES), the display control unit 12 causes the process routine to proceed to Step S105. In Step S105, the display control unit 12 determines whether "warm-up complete" is displayed on the display device 91. When "warm-up complete" is not displayed (S105: NO), that is, when "warming up" or "stopped" is displayed, the display control unit 12 causes the process routine to proceed to Step S106.

In Step S106, the display control unit 12 displays "warming up" on the display device 91. Thereafter, the display control unit 12 ends this process routine. On the other hand, when it is determined in Step S105 that "warm-up complete"

is displayed (S105: YES), the display control unit 12 causes the process routine to proceed to Step S107. That is, the display control unit 12 displays "warm-up complete" on the display device 91. In this process, switching from the warm-up completion indicator to the warm-up indicator can be said to be prohibited by the display control unit 12 when the warm-up completion indicator is displayed. When "warm-up complete" is displayed on the display device 91, the display control unit 12 ends this process routine.

Operations in this embodiment will be described below. With the display control device 10, display of the display device 91 is switched to "warming up" or "warm-up complete" based on whether a warm-up request of the internal combustion engine 30 is issued (S106 and S107).

In a hybrid vehicle including the internal combustion engine 30 and the motor generator 50 as power sources such as the vehicle 90, there may be a situation in which warm-up is requested again after warm-up of the internal combustion engine 30 has been completed.

For example, when motoring is being performed, heat is not generated with combustion of an air-fuel mixture and intake air flowing from the intake passage 32 to the combustion chamber is not combusted and is discharged to the exhaust passage 33. Intake air with a lower temperature in comparison with a case in which combustion is performed may reach the catalyst device 34 and the temperature of the catalyst may decrease. Accordingly, when a period of time in which motoring is being performed after warm-up of the internal combustion engine 30 has been completed increases, the temperature of the coolant may decrease or the temperature of the catalyst may decrease, and thus warm-up may be requested.

For example, it is assumed that the operation of the internal combustion engine 30 is stopped after warm-up of the internal combustion engine 30 has been completed, and the power source of the vehicle 90 is switched to the motor generator 50. In this case, since activation of the water pump 47 is stopped, a coolant staying in the first coolant passage 41 is cooled by the radiator 45 and thus the temperature thereof is likely to decrease. Thereafter, when the internal combustion engine 30 is started again and the water pump 47 is activated, the coolant cooled by the radiator 45 flows into to the water jacket. In this case, when the temperature of the coolant in the water jacket is equal to or higher than the determination coolant temperature at the time of starting of the internal combustion engine 30 and the coolant flows into the water jacket from the first coolant passage 41 after the internal combustion engine 30 has been started, the temperature of the coolant in the water jacket may become lower than the determination coolant temperature. That is, when the operation of the internal combustion engine 30 is stopped after warm-up of the internal combustion engine 30 has been completed and the internal combustion engine 30 is started again, the temperature of the coolant in the water jacket decreases and thus warm-up may be requested.

When warm-up is performed again after warm-up of the internal combustion engine 30 has been completed as described above, it is assumed that information which is displayed on the display device 91 is switched based on only whether a warm-up request has been issued. When the internal combustion engine 30 continues to operate at the time of motoring, a driver of the vehicle 90 may recognize that state. When display is switched from "warm-up complete" to "warming up" while motoring is being performed, the driver may feel re-performing of warm-up in spite of completion of warm-up. When a coolant with a low temperature flows into the water jacket after the internal combustion engine 30 has been started, "warm-up complete" may be displayed because a warm-up request has not been issued at the time of starting, and display may be switched from "warm-up complete" to "warming up" because a warm-up request is issued after the coolant with a low temperature has flown thereinto. In this way, when display is switched from "warm-up complete" to "warming up," the driver who has recognized completion of warm-up once may feel discomfort. That is, when warm-up is performed again after warm-up of the internal combustion engine 30 has been completed and thus the driver of the vehicle 90 is notified that warm-up is being performed, the state which is recognized by the driver is different from information of which the driver is notified and thus the driver may feel discomfort.

In this regard, with the display control device 10, switching from "warm-up complete" to "warming up" is prohibited when "warm-up complete" is displayed on the display device 91. Specifically, when warm-up of the internal combustion engine 30 is completed and a warm-up request is not issued (S104: NO), the display control device 10 displays "warm-up complete" on the display device 91 (S107). Thereafter, when a warm-up request is issued again (S104: YES), "warm-up complete" is being displayed on the display device 91 (S105: YES) and thus the display control device 10 prohibits switching from "warm-up complete" to "warming up" and displays "warm-up complete" on the display device 91 (S107).

When the internal combustion engine 30 is operating and the starting operation of the internal combustion engine 30 is being performed (S103: YES), the display control device 10 displays "stopped" on the display device 91 (S102). That is, when the operation of the internal combustion engine 30 is stopped after warm-up of the internal combustion engine 30 has been completed and then the internal combustion engine 30 is restarted, "stopped" continues to be displayed on the display device 91 without displaying "warm-up complete" while the starting operation of the internal combustion engine 30 is being performed. When a warm-up request is issued after the starting operation of the internal combustion engine 30 has been completed, the display control device 10 switches display of the display device 91 on which "stopped" is displayed to "warming up" (S106).

Advantageous effects in this embodiment will be described below. (1) In the display control device 10, while the internal combustion engine 30 is operating, display of the display device 91 is not switched from "warm-up complete" to "warming up." Accordingly, even when a warm-up request is issued again while the internal combustion engine 30 is operating after warm-up of the internal combustion engine 30 has been completed, the display device 91 continues to display "warm-up completion." Accordingly, it is possible to prevent a driver from feeling discomfort due to re-performing of warm-up after the warm-up has been completed in spite of recognition of the driver that the internal combustion engine 30 continues to operate.

(2) In the display control device 10, "stopped" is displayed on the display device 91 while the starting operation of the internal combustion engine 30 is being performed. That is, while the starting operation of the internal combustion engine 30 is being performed, "warm-up complete" is not displayed even if a warm-up request is not issued. Accordingly, it is possible to prevent "warm-up complete" from being displayed when the starting operation of the internal combustion engine 30 is being performed, it is not determined whether warm-up is necessary, and a warm-up request is not issued yet. As a result, it is possible to switch display of the display device 91 based on whether a warm-up request is issued after the starting operation of the internal combustion engine 30 has been completed.

(3) In the display control device 10, while the starting operation of the internal combustion engine 30 is being performed, "stopped" is displayed on the display device 91 without displaying "warm-up completion." In the display control device 10, when a warm-up request for the internal combustion engine 30 is issued and "warm-up complete" is being displayed on the display device 91, switching of display of the display device 91 to "warming up" is prohibited. On the other hand, when "stopped" is being displayed on the display device 91, the display control device 10 can switch the display of the display device 91 to "warming up" Based on the warm-up request. Accordingly, even when a warm-up request is issued due to flowing of a coolant with a low temperature into the water jacket after the internal combustion engine 30 has been started, it is possible to switch the display of the display device 91 to "warming up" based on issuance of the warm-up request. Since the display of the display device 91 is not switched from "warm-up complete" to "warming up" after the internal combustion engine 30 has been started, it is possible to prevent a driver from feeling discomfort due to the difference between the state which is recognized by the driver and information of which the driver is notified.

(4) With the display control device 10, it is possible to notify a driver that the operation of the internal combustion engine 30 is stopped by displaying "stopped" on the display device 91 when the operation of the internal combustion engine 30 is stopped.

The above embodiment can be modified as follows. The above embodiment and the following modified examples can be combined unless technical confliction arises. In the embodiment, "warm-up complete" is not displayed by displaying "stopped" when the starting operation of the internal combustion engine 30 is being performed, but "stopped" may not be continuously displayed until the starting operation of the internal combustion engine 30 ends As long as "warm-up complete" is not displayed on the display device 91 in a period in which a warm-up request is issued after the internal combustion engine 30 has been started, the same advantages as in the embodiment can be achieved.

The cooling device 40 illustrated in FIG. 1 according to the embodiment is an example of an element for cooling a coolant circulating in the water jacket in the internal combustion engine 30. The configuration of the vehicle 90 illustrated in FIG. 1 according to the embodiment is an example. The display control device 10 can be applied to a vehicle which includes the internal combustion engine 30, the motor generator 50, and the display device 91 and which can travel with power from the motor generator 50 in a state in which supply of fuel to the internal combustion engine 30 is stopped.

The function corresponding to the display control device 10 in the embodiment may be provided in the vehicle control device 20. In this case, the vehicle control device 20 serves as a control device that controls the display device 91.

What is claimed is:

1. A control device for a vehicle including an internal combustion engine and a motor generator that are power sources and a display device that displays information indicating an operation state of the internal combustion engine, the vehicle being able to travel with a power of the motor generator in a state in which supply of fuel to the internal combustion engine is stopped, the control device comprising:
   an acquisition unit configured to acquire the operation state of the internal combustion engine; and
   a display control unit configured to switch information which is displayed on the display device between at least a warm-up indicator and a warm-up completion indicator while the internal combustion engine is operating, the warm-up indicator configured to notify that warm-up of the internal combustion engine is being performed and the warm-up completion indicator configured to notify that warm-up of the internal combustion engine has been completed,
   wherein the display control unit is configured to prohibit switching from the warm-up completion indicator to the warm-up indicator when the warm-up completion indicator is being displayed on the display device.

2. The control device according to claim 1, wherein the display control unit is configured to:
   switch the information which is display on the display device between the warm-up indicator, the warm-up completion indicator, and a stop indicator configured to notify that the operation of the internal combustion engine is stopped;
   display the stop indicator on the display device when the operation of the internal combustion engine is stopped;
   display the warm-up indicator on the display device when the internal combustion engine is operating and a warm-up request which is a request for warming up the internal combustion engine is issued;
   display the warm-up completion indicator on the display device when the internal combustion engine is operating and the warm-up request is not issued; and
   display the stop indicator on the display device when the internal combustion engine is operating, the warm-up request is not issued, and a starting operation of the internal combustion engine is being performed.

* * * * *